(12) United States Patent
Kitano

(10) Patent No.: US 6,563,720 B2
(45) Date of Patent: May 13, 2003

(54) SWITCHING POWER SUPPLY DEVICE

(75) Inventor: Saburou Kitano, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/101,015

(22) Filed: Mar. 19, 2002

(65) Prior Publication Data

US 2002/0141205 A1 Oct. 3, 2002

(30) Foreign Application Priority Data

Mar. 29, 2001 (JP) .......................................... 2001-97284

(51) Int. Cl.$^7$ ............................................. H02M 3/335
(52) U.S. Cl. ................................. 363/21.15; 363/21.12
(58) Field of Search .............................. 363/20, 21.01, 363/21.07, 21.12, 21.15, 95, 97, 131

(56) References Cited

U.S. PATENT DOCUMENTS

| 4,523,265 A | * | 6/1985 | Deprez ......................... 363/21 |
| 5,798,913 A | * | 8/1998 | Tiesinga et al. ............... 363/21 |
| 6,477,063 B2 | * | 11/2002 | Ishii et al. ................ 363/21.04 |

FOREIGN PATENT DOCUMENTS

| JP | 07-245947 | 9/1995 |
| JP | 2000-341945 | 12/2000 |

OTHER PUBLICATIONS

TA1319AP/AF: "Integrated Circuit for Power Supply Control, Including Standby Mode" (Dec. 2000).

Design Engineering Specification –1: Intelligent Power Device (IPD) for Standby Power Source (2000).

* cited by examiner

*Primary Examiner*—Matthew Nguyen
(74) *Attorney, Agent, or Firm*—David G. Conlin; Steven M. Jensen; Edwards & Angell, LLP

(57) ABSTRACT

A switching power supply device is arranged such that a switching of a main switching element is controlled by a control circuit in accordance with output voltage information fed back from the secondary winding side. On this account the switching power supply device has an output voltage being stabilized to be a target value. Moreover, fluctuation of the control is detected only under the light load in accordance with a nonlinear characteristic of a fluctuation detection circuit. A fluctuation in an output of the fluctuation detection circuit is extracted by a differentiating circuit composed of a capacitor and dividing voltage resistors, and the output of the differentiating circuit is superposed on a value of the divided output voltage so as to be fed back. In this manner the fluctuation component, having relatively short change periodicity (like A.C.), of the control fluctuation is superposed on the output voltage information having relatively long change periodicity (like D.C.) so that this enables the control circuit to judge that the device operates under the light load, from the component being fed back. Thus it is unnecessary to send a signal indicating the weight of the load and this makes it possible to lower the power consumption of the device connected to an apparatus in standby, with a simple arrangement.

11 Claims, 7 Drawing Sheets

SWITCHING POWER SUPPLY DEVICE

FIELD OF THE INVENTION

The present invention relates to a switching power supply device which is preferably used as a so-called A.C.–D.C. convertor, D.C.—D.C. convertor and so forth.

BACKGROUND OF THE INVENTION

There are switching power supply devices widely used for various apparatuses such as mobile electronic apparatuses. The devices switch a D.C., which is either obtained by rectifying/smoothing commercial A.C. or supplied from a battery, by applying high frequency around several hundred kHz so that the supplied voltage is effectively converted to a target value by means of a small transformer.

A typical example of this type of power supply device which has been widely used is a pulse-width modulation (PWM) type switching power supply device, which is a switching power supply device arranged such that in accordance with a result of detecting an output voltage on the secondary winding side by a voltage detection circuit, a control circuit controls a width of a switching pulse of a main switching element so that a target output voltage on the secondary winding side can be obtained.

Another example of the power device having been widely used is a ringing choke convertor (RCC) type switching power supply device, which is a power supply device arranged such that exciting energy accumulated in a transformer during a main switching element being turned on is transmitted to a circuit in the secondary winding side during the element being turned off, and after the transmission being finished the main switching element is turned on again by feeding a ringing pulse generated in a control winding of the transformer back to a control terminal of the element via a D.C. cut capacitor.

FIG. 8 is a block diagram showing an electrical arrangement of a typical conventional switching power supply device 1. This switching power supply device 1 is an RCC-type switching power supply device in which a D.C., obtained by rectifying a commercial A.C. 3 by a main power supply circuit composed of a diode bridge 2 and a smoothing capacitor c1, is supplied to a circuit between a main power supply line 4 of a high-level side and a main power supply line 5 of a low-level side. The circuit between the main power supply lines 4 and 5 is arranged as a primary winding n1 of a transformer n and a main switching element q are connected in series. The main switching element q is, for instance, a bipolar transistor or a field-effect transistor. Incidentally, in this example shown in FIG. 8, the field-effect transistor is adopted as the main switching element. The main switching element q is turned on or off by a control circuit 6.

When the main switching element q is turned on, exciting energy is accumulated in the primary winding n1. Then the energy is induced to the side of a secondary winding n2 during the element q is turned off, and after being smoothed in a diode d1 and a smoothing capacitor c2, the energy is sent from output terminals 7 and 8 to an unillustrated load.

An output voltage between the output terminals 7 and 8 is divided by voltage dividing resistors r1 and r2, and then the divided voltage is sent to one input of a comparator circuit 9, while to the other input of the comparator circuit 9, a reference voltage from a reference voltage source 10 is supplied. The value of the divided output voltage is compared with the reference voltage, and the result of the comparison is fed back to the control circuit 6 via a photodiode d2 of a photocoupler pc1 and a phototransistor tr1. The control circuit 6 transmits a drive signal to the main switching element q on the basis of: a D.C. voltage provided via a starting resistor r3; an induction voltage transmitted from an auxiliary winding n3 of the transformer n; and output voltage information transmitted from the comparator circuit 9 via the photocoupler pc1, so that the circuit 6 controls the switching of the main switching element q to stabilize the output voltage of the switching power supply device 1.

In the meantime, the switching power supply device 1 is provided with members for conducting the switching intermittently, namely a photocoupler pc2, a logic circuit 11, comparators 12 and 13, the above-mentioned reference source 10, and voltage dividing resistors r4, r5, and r6, for lowering power consumption of the device 1 when an apparatus supplied power from the device 1 is in standby. In this arrangement, the control circuit 6 makes the main switching element q intermittently switch on or off at the time when a standby signal is supplied from a control input terminal 14.

That is to say, the comparator 12 monitors the output voltage of the switching power supply device 1 so as to send a stop instruction to the control circuit 6 via the logic circuit 11 and the photocoupler pc2 when a voltage value of the high-level side, divided by the voltage dividing resistors r4, r5, and r6, is not less than the reference voltage of the reference voltage source 10, so that the comparator 12 stops the operation of the switching power supply device 1. The comperator 13 also monitors the output voltage of the switching power supply device 1 so as to send a start instruction to the control circuit 6 via the logic circuit 11 and the photocoupler pc2 when a voltage value of the low-level side, divided by the voltage dividing resistors r4, r5, and r6, is gradually decreased due to the stop of the switching operation so as to be not more than the reference voltage, so that the comparator 13 starts the operation of the switching power supply device 1. The output voltage starts to increase again as the operation is resumed, and when the divided voltage value of the high-level side becomes not less than the reference voltage, the operation stops again, so that this sequence is repeated.

SUMMARY OF THE INVENTION

The conventional techniques have a problem such that a circuit arrangement is complicated. That is to say, apart from the comparator circuit 9 for monitoring the output voltage to stabilize the same, it is necessary to additionally provide the comparators 12 and 13 which are voltage monitoring means. Moreover, in accordance with the voltage information detected in the secondary winding side of the transformer n, the control circuit 6 in the primary winding side makes the switching power supply device operate intermittently. In this case the primary winding side cannot be directly connected to the secondary winding side since it interrupts the input being insulated from the output, so that these two have to be connected via the photocoupler pc2. Furthermore, the device has to receive the standby signal from the apparatus to which the power is supplied so that the device has to be connected to the apparatus using a control line as well as the power supply line, and moreover the apparatus has to be arranged as being capable of sending the control signal, when the device is adopted as an A.C. adapter.

The present invention aims at providing a switching power supply device with low power consumption when an apparatus to which the device supplies the power is in standby, with a simple arrangement.

To achieve the above-mentioned aim, the switching power supply device of the present invention, provided with control means for controlling switching of a main switching element that switches on or off a supplied D.C. voltage in accordance with output voltage information fed back from a secondary winding side so that an output voltage is stabilized to be a target voltage, includes:

fluctuation detection means, for detecting a fluctuation of controlling of the control means and transmitting a detected output in accordance with nonlinear output characteristics, only under a light load; and superposition means, for attracting a fluctuation in the output from the fluctuation detection means and superposing the fluctuation on the output voltage information, wherein the control means judges that the device operates under the light load in accordance with the fluctuation, which has been fed back.

Thus this enables the control means to judge that the device operates under the light load in accordance with the fluctuation so that it is unnecessary to supply a signal indicating the weight of the load from the outside, and hence it is possible to provide the switching power supply device with low power consumption when an apparatus to which the device supplies the power is in standby, with a simple arrangement.

The switching power supply device of the present invention may be arranged such that: the superposition means is a differentiating circuit including a capacitor for removing a D.C. component and voltage dividing resistors for dividing an output voltage so as to produce the output voltage information; the output from the fluctuation detection means is supplied to a node between the voltage dividing resistors via the capacitor; and the output voltage information is produced by comparing a voltage at the node with a reference voltage by means of a comparator circuit.

According to this arrangement, the differentiating circuit can extract an A.C.-like component in the control fluctuation and superpose the component on the output voltage information. Thus it is possible to adopt a simple circuit, in which the existing voltage dividing resistors are provided with the capacitor for removing a D.C. component, as the superposition means.

The switching power supply device of the present invention may be arranged such that the fluctuation detection means includes: a series circuit, provided in parallel with a secondary winding of a transformer and composed of a diode and a capacitor, which is charged by an induction voltage having one polarity so as to supply the D.C. voltage in accordance with electric charges of the capacitor; and a load resistor for discharging electric charges.

According to this arrangement, it is possible to transform the output into a D.C. voltage level in accordance with the nonlinear characteristic so that the D.C. voltage level indicates a high frequency voltage of the control fluctuation being detected and rectified.

Thus the fluctuation detection means can obtain the nonlinear characteristic with a simple arrangement so that it is possible to: certainly remove a fluctuation component under the heavy load; detect only the fluctuation component under the light load; and feed the same back.

The switching power supply device of the present invention may be arranged such that the fluctuation detection means further includes a current limitation resistor, which is provided in series with respect to the diode, for limiting a charge current of the capacitor.

According to this arrangement, it is possible to control the amount (degree) of superposition of the output voltage from the fluctuation detection circuit on the output voltage information. On this account, it is possible to adjust the critical point of the nonlinear characteristic.

Thus it is possible to set the level of the output voltage at the moment of shifting from the state of continuous switching operation to the state of intermittently conducted switching operation.

The switching power supply device of the present invention may be arranged such that the fluctuation detection means further includes a Zener diode provided in parallel with the capacitor.

According to this arrangement, provided that the Zener diode has a Zener voltage at the critical level of the nonlinear characteristic, a voltage higher than the Zener voltage is eliminated so that it is possible to make the nonlinear characteristic close to an optimum characteristic.

For a fuller understanding of the nature and advantages of the invention, reference should be made to the ensuing detailed description taken in conjunction with the accompanying drawings.

DESCRIPTION OF THE EMBODIMENTS

The following description will discuss an embodiment in accordance with the present invention in reference to FIGS. 1 to 5.

Figure 1:
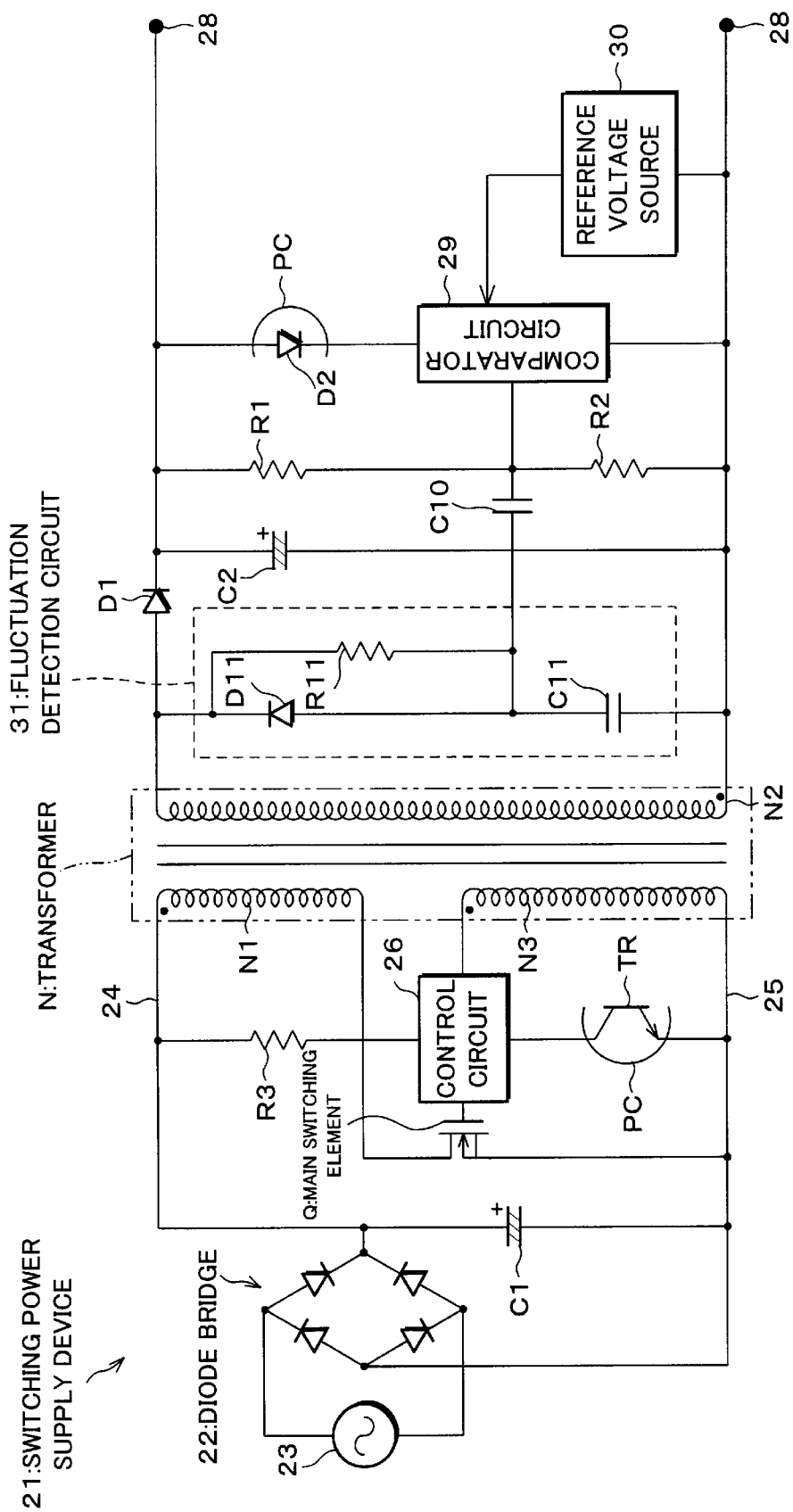
FIG. 1 is a block diagram showing an electrical arrangement of a switching power supply device in accordance with an embodiment of the present invention.

FIG. 1 is a block diagram showing an electrical arrangement of a switching power supply device 21 in accordance with an embodiment of the present invention. This switching power supply device 21 is an RCC-type switching power supply device, in which a D.C., obtained by rectifying a commercial A.C. 23 by means of a main power supply circuit made up of a diode bridge 22 and a smoothing capacitor C1, is sent to a circuit between a main power supply line 24 of the high-level side and a main power supply line 25 of the low-level side. The circuit between the main power supply lines 24 and 25 is arranged such that a primary winding N1 of a transformer N and a main switching element Q are connected in series. The main switching element Q is, for instance, a bipolar transistor or a field-effect transistor. In this example shown in FIG. 1, a field-effect transistor is adopted as the main switching element Q. The main switching element Q is turned on or off by a control circuit 26.

This switching power supply device 21 is a flyback-type power supply device, in which exciting energy is accumulated in the primary winding N1 when the main switching element Q is turned on, and then the energy is induced to the side of a secondary winding N2 during the element Q being turned off, and after being smoothed by a diode D1 and a smoothing capacitor C2, the energy is sent from output terminals 27 and 28 to an unillustrated load.

An output voltage between the output terminals 27 and 28 is divided by voltage dividing resistors R1 and R2 so that the divided voltage is sent to one input of a comparator circuit 29. To the other input of the comparator circuit 29, a reference voltage from a reference voltage source 30 is supplied, and the result of the comparison between a value of the divided output voltage and the reference voltage is fed back to the control circuit 26 via a photo diode D2 of a photocoupler PC and a phototransistor TR. The control circuit 26 sends a drive signal to the main switching element Q on the basis of a D.C. voltage provided via a starting resistor R3, an induction voltage sent from an auxiliary winding N3 of the transformer N, and output voltage information supplied from the comparator circuit 29 via the photocoupler PC, so as to control the switching operation of the main switching element Q to stabilize the output voltage of the switching power supply device 21.

It has to be noted that the switching power supply device 21 of the present embodiment is provided with:

a fluctuation detection circuit 31 in the secondary winding side for generating a signal matched with the aforementioned stop instruction; and a capacitor C10 which is superposition means, in which the result of the detection is superposed on the output voltage information which is fed back to the primary winding side from the comparator circuit 29, and the control circuit 26 also controls the start/stop of the switching operation in accordance with the result of the detection by the fluctuation detection circuit 31, along with the aforementioned operation to keep the voltage constant. The control circuit 26 of the present embodiment continuously conducts the switching operation under the heavy load whereas the circuit 26 intermittently stops/starts the switching operation under the light load. Moreover, the control circuit 26 conducts a burst switching operation when the circuit is operating under the light load as in the case under the heavy load.

The fluctuation detection circuit 31, provided in parallel with the secondary winding N2, includes:

a series circuit made up of a diode D11 and a capacitor C11, in which when the induction voltage is in either one polarity, the induction voltage charges the diode D11 and the capacitor C11 and a D.C. voltage in accordance with the voltage is put out; and a load resistor R11, provided to bypass the diode D11, for discharging electric charge of the capacitor C11 when the induction voltage is in the reverse polarity.

Thus from the capacitor C11 of the fluctuation detection circuit 31, a constant voltage is supplied under the heavy load, as described later. Meanwhile under the light load, a D.C. voltage, varied from the aforementioned constant voltage by an amount of a high frequency voltage of control fluctuation and obtained by way of detecting and rectifying the induction voltage of the secondary winding N2, is supplied from the capacitor C11 of the fluctuation detection circuit 31. The D.C. voltage is supplied from a node between the capacitor C11 and the diode D11 so as to be superposed on a voltage at a node between the voltage dividing resistors R1 and R2 via the capacitor C10, and sent to the comparator circuit 29.

The superposition means is a differentiating circuit, made up of: the capacitor C10 for removing a D.C. component and extracting a fluctuation in the D.C. voltage; and the voltage dividing resistors R1 and R2. The capacitor C10 and the voltage dividing resistors R1 and R2 constitute a time constant, and the differentiating circuit as the superposition means can extract the fluctuation in the D.C. voltage supplied from the fluctuation detection circuit 31 by increasing the time constant large enough.

The superposition means may be alternatively arranged as long as a signal processing as follows can be done; a fluctuation component is extracted so as to be fed back to the primary winding side without influencing on the output voltage information which has relatively long periodicity (like D.C.), and is fed back to the primary winding side. The fluctuation component detected by the fluctuation detection circuit 31 may be put out in a signal form such as a high frequency signal and a digital signal other than the D.C. voltage, as long as the signal processing by the superposition means can be done.

The control fluctuation occurs regardless of the weight of the load. This is because variance of the input voltage caused by superposition of a ripple on the commercial A.C. 23 and subtle variance of the load. The switching power supply device is subjected to a feedback control to keep the output voltage constant. In the power supply device a phase characteristic of the feedback control is regulated by providing a speed-up capacitor and a delay capacitor, etc., however, responsivity and stability are mutually contradictory. Thus it is difficult to keep the output voltage to be always completely matched with a target value by hunting, and thus the control fluctuation is a difference between the actual output voltage and the target voltage. Therefore the phase characteristic is optimized to keep the width of the hunching within tolerance.

Figure 2:
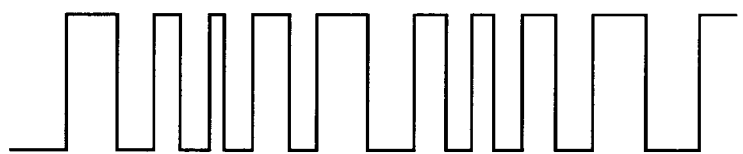
FIG. 2 is a waveform illustration showing a state of control fluctuation of an RCC-type switching power supply device under the light load.

FIG. 2 shows a state of the control fluctuation of an RCC-type switching power supply device under the light load. A waveform in FIG. 2 is a drain voltage waveform of the main switching element Q, and a low-level period of the waveform indicates an ON period of the main switching element Q whereas a high-level period thereof indicates an OFF period. The RCC-type switching power supply device has a characteristic such that a switching frequency varies in accordance with the weight of the load. Especially under the light load, the switching frequency is high so that each element related to the output voltage control cannot operate speedy enough to keep up with the control instruction. Thus the following control fluctuation, i.e., the control fluctuation in which a switching periodicity varies as shown in FIG. 2, occurs despite the weight of the load is kept constant.

Figure 3:
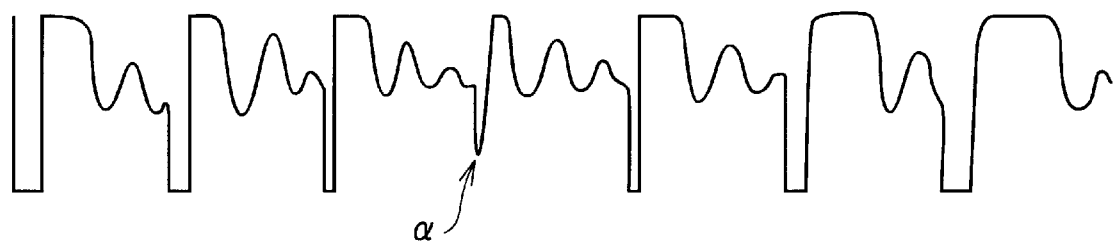
FIG. 3 is a waveform illustration showing a state of control fluctuation of a PWM-type switching power supply device under the light load.

In the meantime, FIG. 3 is also a waveform illustration of a drain voltage of the main switching element of a PWM-type switching power supply device under the light load. From the illustration, it is observed that in the PWM-type device, although the switching periodicity is constant, some control fluctuation is observed and an ON duty of the main switching element is not constant despite the weight of the load is constant, due to the control error of the output voltage. Especially under the light load close to no load, as a sign α indicates that there is a period in which the drain voltage does not reach level 0 despite in the period of the main switch element being turned on, since the period is too short.

Figure 4:
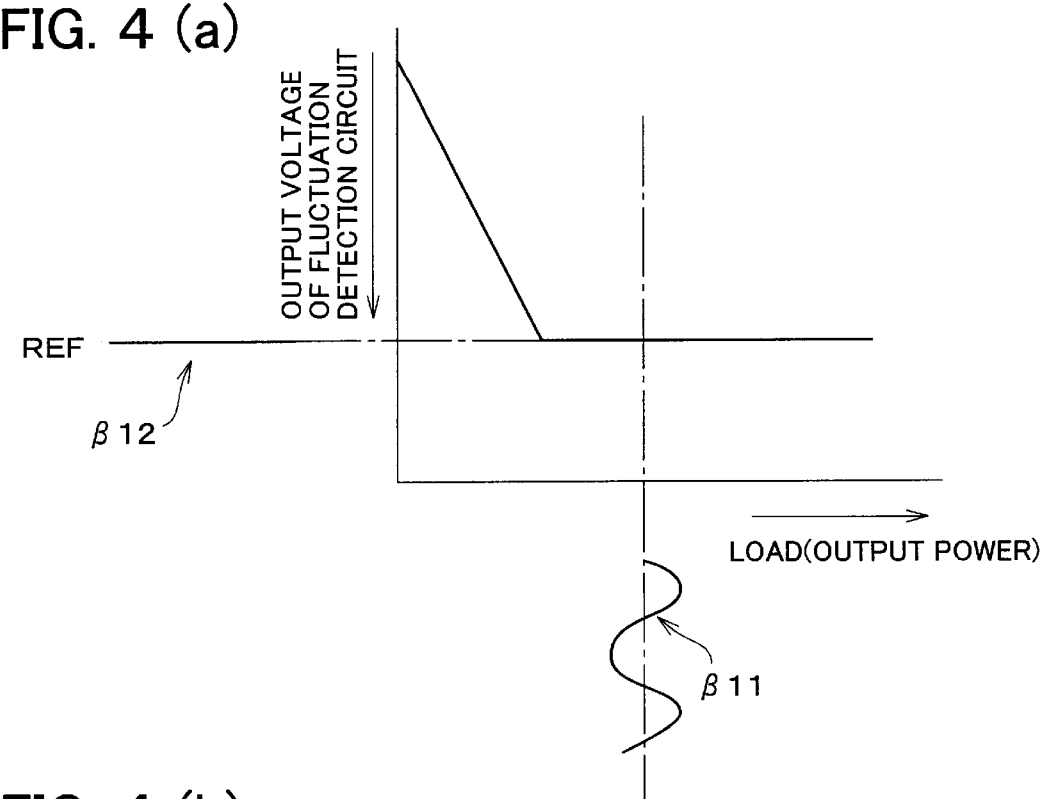
FIG. 4(a) is a graph showing output characteristics of a fluctuation detection circuit of the switching power supply device illustrated in FIG. 1 under the heavy load.
FIG. 4(b) is a graph showing output characteristics of a fluctuation detection circuit of the switching power supply device illustrated in FIG. 1 under the light load.
Figure 4:
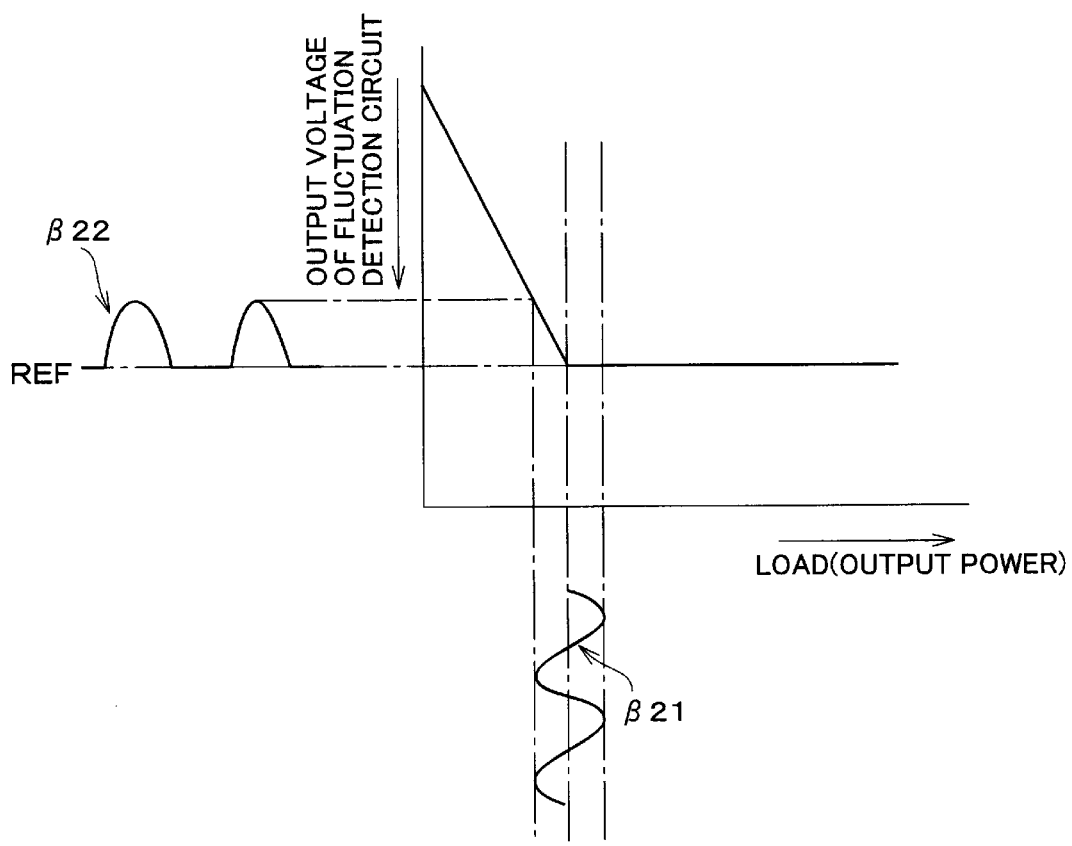

As shown in FIG. 4(*a*), the output characteristics of the fluctuation detection circuit 31 is nonlinear such that despite the output voltage level decreases in accordance with an increase of the load from a state of no load, the output voltage level no longer decrease in spite of the increase of the load after the level reaches a predetermined critical level REF. On this account, although the control fluctuation indicated as a sign β11 in FIG. 4(*a*) occurs under the heavy load, the fluctuation detection circuit 31 does not detect the control fluctuation so that it is possible to prevent the fluctuation component from being included in the output indicated as a sign β12. In the meantime, when the load is light, the fluctuation detection circuit 31 detects the control fluctuation indicated as a sign β21 in FIG. 4(*b*) so that it is possible to let the fluctuation component be included in the output, as a sign β22 indicates.

The nonlinear characteristic above is realized as follows. Although the secondary winding N2 is driven at a constant oscillation, the output voltage (voltage supplied from the capacitor C11) of the fluctuation detection circuit 31 has a peak value (maximum value in negative polarity) at a voltage determined by a charge voltage of the smoothing capacitor C1 and a turn ratio of the winding N1 to N2, when the diode D11 is turned on under the heavy load.

Since an ON current of the diode D11 is limited by an inductance of the secondary winding N2, the aforementioned output voltage linearly increases in accordance with the increase of output power when the switching power supply device operates with a small amount of output power, but the increase of the charge voltage of the capacitor C11 is slowed when the charge voltage reaches around the aforementioned driven voltage (peak value) of the secondary winding N2. On this account the output voltage shows the nonlinear characteristic as shown in FIGS. 4(*a*) and 4(*b*). The characteristic shown in FIGS. 4(*a*) and 4(*b*) is an optimum characteristic in which the output voltage sharply varies at the critical point so as to seem to have a digital form. However, in reality the arrangement as above has an analog characteristic so that the variance of the voltage is not so sharp as above. It is, however, noted that the error is not considerable so as not to cause any significant problem.

When the load resistor R11 is not provided, the charge voltage of the capacitor C11 constantly increases so that it is not possible to achieve the desired purpose. The load resistor R11 can fulfil the same function when the same is connected to the other terminal of the secondary winding N2, and the speed of discharging the capacitor C11 varies in accordance with the value of resistance of the load resistor R11. Thus by adjusting the value of the load resistor R11, it is possible to set intermittency time which is described later at an optimum value for the circuit operation.

It is also possible to provide a resistor between the capacitor C10 and the node between the voltage dividing resistors R1 and R2, and this makes it possible to adjust a degree of superposition of the output voltage of the differentiating circuit (output voltage of the capacitor C10) with respect to the output voltage information.

Figure 5:
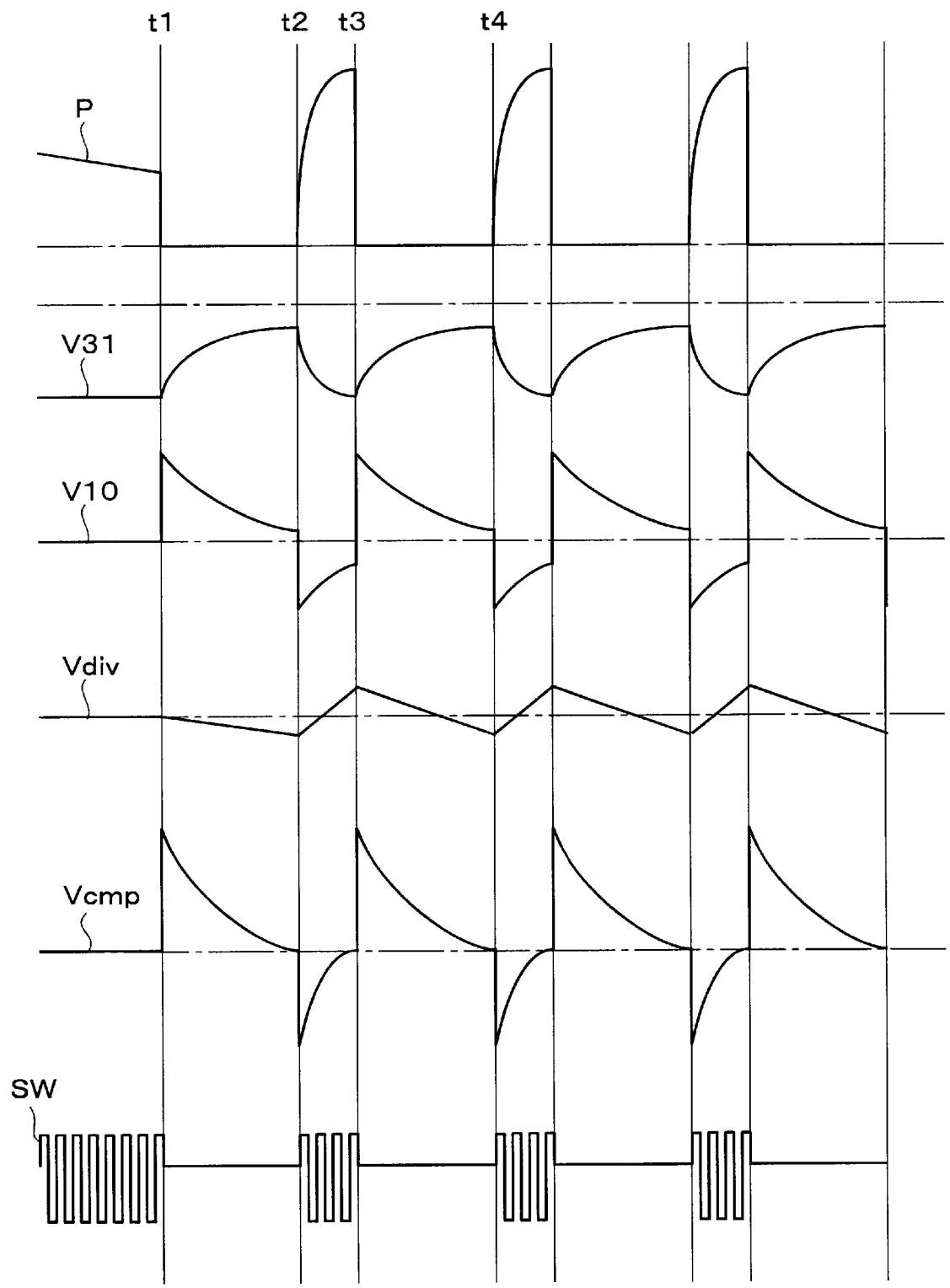
FIG. 5 is a waveform illustration describing an operation of the switching power supply device illustrated in FIG. 1.

FIG. 5 is a waveform illustration describing the operation of the switching power supply device 21 arranged as above. In this figure, a sign P indicates an amount of the output power of the device 21. The figure shows that the higher a level of the waveform is, the higher the power with which the device 21 operates is, i.e. the switching periodicity with which the device 21 operates is longer. Moreover, in the PWM-type switching power supply device, the high level of the waveform indicates that the device operates with a long duty. Incidentally, among dashed lines in FIG. 5, a line described with waveforms P, V31, and V10 indicates a level 0, a line described with a waveform Vdiv indicates a predetermined output voltage of the switching power supply device 21, and a line described with a waveform Vcmp indicates the reference voltage from the reference voltage source 30.

When the RCC-type switching power supply device 21 operates under the heavy load which load is constant not after a time t1, a periodical and continuous switching operation shown as SW in FIG. 5 is conducted in the device 21. Meanwhile when the PWM-type device 21 is employed, a continuous switching operation is conducted with a constant ON duty in the device 21. In the present case the output voltage level of the fluctuation detection circuit 31 indicated as V31 in FIG. 5 is, as understood from input output characteristics indicated in FIGS. 4(*a*) and 4(*b*), at a maximum voltage level without a ripple voltage and being negative in polarity, due to a cancel facility against the control fluctuation.

The switching power supply device 21 is a flyback type, and the output voltage level of the fluctuation detection circuit 31 is negative in polarity, due to the polarity of the diode D11 as described above. When the polarity of the winding of the transformer N or the polarity of the diode D11 is inverted, the aforementioned result of the detection is positive in polarity. In this manner the output polarity of the fluctuation detection circuit 31 is not necessarily set as negative so as to depend on conditions of the circuit arrangement such as which plus/minus input terminal of the comparator provided inside the comparator circuit 29 obtains the reference voltage. Moreover, the fluctuation detection circuit 31 detects the control fluctuation, which is a high frequency, of the output voltage as described above so that the circuit 31 may be provided in other appropriate parts of the device 21 as long as the circuit 31 can detect a component of the high frequency.

Furthermore, although the capacitor C10 which is the superposition means and the voltage dividing resistors R1 and R2 perform differentiation of the output voltage of the fluctuation detection circuit 31, it is possible to arrange the control circuit 26 to make it unnecessary to perform this differentiation precisely, so that it is not required to provide an ad hoc arithmetic circuit for the differentiation. In other words, only by removing a D.C. component from the output voltage of the circuit 31 by means of the capacitor C10 and connecting the capacitor 10 to the next stage, a differentiating circuit is naturally composed of the capacitor C10 and an input resistor or an input impedance of a circuit in the next stage, such as the voltage dividing resistors R1 and R2, etc. The differential characteristic (time constant) of the differentiating circuit above depends on which circuit is connected in the next stage. Thus the superposition means can be arbitrarily arranged as long as the precision of the differentiation is matched with the arrangement of the control circuit 26.

Before the time t1, a differential output of the capacitor C10 is zero, the output voltage of the capacitor C10 indicated as V10 in FIG. 5 is constant, and what is supplied to the comparator circuit 29, indicated as Vcmp in FIG. 5, is only the value Vdiv, as described above, of the output voltage divided by the voltage dividing resistors R1 and R2, so that the supplied signal is constant.

The load becomes lighter from the state as above, and when the output power indicated as P in FIG. 5 becomes not more than a level REF of the critical point indicated as the characteristics in FIGS. 4(a) and 4(b), fluctuation occurs in the output voltage level of the fluctuation detection circuit 31 indicated as V31 in FIG. 5. Thus owing to the differentiation in the capacitor C10, the output of the capacitor C10 is instantly increased as indicated with V10 in FIG. 5. The voltage of this output is superposed on the value Vdiv of the divided output voltage so that the input to the comparator circuit 29 becomes as indicated with Vcmp in FIG. 5 and compared with the reference voltage indicated as the dashed line. Then the output voltage information, which suggests that the output voltage is high and how high the voltage is, is sent to the control circuit 26 via the photocoupler PC. As a result the output voltage is decreased, i.e. the output power is lessened. That is to say, the following process is repeated like a chain reaction in a short time; the output voltage V31 of the fluctuation detection circuit 31 (output voltage of the capacitor C11) is further increased, the output voltage V10 of the capacitor C10 is further increased, the input Vcmp which is supplied to the comparator circuit 29 is further increased, and the control circuit 26 further decreases the output voltage. On this account, the switching power supply device 21 instantly stops the switching operation at the time t1.

After the switching operation is stopped at the time t1, the smoothing capacitor C2 on the secondary winding side does not receive the power from the transformer N, and hence the capacitor C2 only discharges the power through the output terminals 27 and 28. At this moment, the output voltage of the switching power supply device 21 and the value Vdiv of the divided output voltage start to decrease. However, even if the value Vdiv becomes less than the aforementioned predetermined output voltage, the switching operation is kept stopped as described below.

That is, the output voltage level of the fluctuation detection circuit 31 indicated as V31 in FIG. 5 exponentially increases with a delay from the termination of the switching operation due to the discharge of the capacitor C11, i.e. approaches the level 0. Also the output voltage of the capacitor C10 indicated as V10 in FIG. 5 gradually decreases due to the charging of the capacitor C10. This output voltage V10 of the capacitor C10 is superposed on the divided output voltage indicated as Vdiv in FIG. 5 so that the input voltage of the comparator circuit 29 is, as indicated with Vcmp in FIG. 5, kept at a level higher the reference voltage, and hence the switching operation is kept stopped as described above.

As time goes by, the degree of the increase of the output voltage level of the fluctuation detection circuit 31 indicated as V31 in FIG. 5 exponentially becomes mild, and a level of a differential waveform of the output voltage decreases as V10 in FIG. 5 indicates. Also the value of the divided output voltage indicated as Vdiv in FIG. 5 keeps on decreasing. Thus the level of the input signal of the comparator circuit 29 on which signal the signals above are superposed keeps on decreasing as indicated with Vcmp in FIG. 5, and when the level reaches around the same value with the voltage level of the reference voltage at a time t2, the control circuit 26 starts to conduct the burst switching operation as indicated with SW in FIG. 5.

The start of the burst switching operation triggers the start of charging the capacitor C11 so that the output voltage starts to exponentially decrease. Thus the output voltage of the capacitor C10 starts to increase after decreasing below the level 0 due to the change of direction of the current. At this moment the value of the divided output voltage also starts to increase. However, the input voltage to the comparator circuit 29 is still lower than the reference voltage and the output voltage of the capacitor C10 abruptly decreases, and thus the control circuit 26 operates to precipitously increase the output power. For instance, when the switching power supply device is arranged as an RCC and timing-control type device, the device starts to operate with a long switching periodicity from the time t2 which is the time of re-starting the switching operation, whereas when the PWM-type device is adopted, the device starts to operate with a long ON duty.

Then the speed of charging the capacitor C11 is exponentially slowed down and the output voltage of the capacitor C10 gradually increases, while the value of the divided output voltage is increasing. Thus when the input voltage to the comparator circuit 29 becomes substantially equal to the reference voltage at a time t3, the control circuit 26 operates to decrease the output power of the switching power supply device 21. On this account the following process is repeated in a moment; the output voltage level of the fluctuation detection circuit 31 turns to increase and the output voltage of the capacitor C10 increases, the input voltage to the comparator circuit 29 increases, the control circuit 26 controls the switch to further decrease the output power of the switching power supply device 21, and the output voltage level of the fluctuation detection circuit 31 further increases. On this account the switching operation instantly stopped. Then the operations conducted in the times t1 to t3 are repeated so that the burst switching continues.

FIG. 5 describes an operation when the state of normal operation (state of continuous switching) is shifted to the intermittent switching (burst switching) by gradually lightening the load. However, when the load is lighter than the condition described in FIG. 5, the period of switching operation from the time t2 to the time t3 is shortened while the switching stop period from the time t3 to the time t4 is extended. The length of extended time of the switching termination is longer than the length of shortened time of the switching operation, and hence the burst switching periodicity between the time t2 to t4 is extended. This is because a following reason.

That is to say, with the load being lightened, the current, put out from the smoothing capacitor C2 in the secondary winding side during the switching operation period, becomes smaller while the voltage of the smoothing capacitor C2 increases further rapidly so that the period during which the value of divided voltage supplied to the comparator circuit 29 reaches the reference voltage is shortened, and as a result the period of switching operation is shortened. Also with the load being lightened, the current, put out from the smoothing capacitor C2 during the switching stop period, decreases and the decrease of the voltage of the current becomes mild, so that the period during which the value of divided voltage supplied to the comparator circuit 29 decreases to the reference voltage becomes longer, and as a result the switching stop period is extended.

On the contrary, with the load being gradually increased from the state of burst switching as indicated in FIG. 5, the current, discharged from the smoothing capacitor C2 to the load during the switching stop period, increases so that the voltage of the smoothing capacitor C2 abruptly decreases. So the period during which the value of the divided voltage decreases to the reference voltage becomes shorter, and as a result the switching stop period becomes shorter. Also, since the current discharged from the smoothing capacitor C2 increases during the switching operation period and the voltage increases further moderately, the period during which the value of the divided output voltage supplied to the comparator circuit 29 is decreased to the reference voltage becomes longer and as a result the switching stop period is extended.

If the load becomes heavier than the condition above, the continuous switching operation at the normal load starts at the moment when the current discharged from the smoothing capacitor C2 to the load becomes equal to the current supplied from the secondary winding N2 of the transformer N to the smoothing capacitor C2 via the diode D1, during the switching operation period.

In this manner the switching power supply device 21 in accordance with the present invention is arranged so that along with the detection of the control fluctuation under the light load by the fluctuation detection circuit 31, the capacitor C10 which is the superposition means extracts the A.C. component of the control fluctuation so as to superpose the component on the output voltage information fed back in a feedback system of the existing output voltage information composed of the voltage dividing resistors R1 and R2, the reference voltage source 30, the photocoupler PC, and the comparator circuit 29 so that the A.C. component of the control fluctuation is fed back to the control circuit 26, and hence it is possible to feedback the component without causing any influence on the output voltage information. On this account, from an apparatus receiving the power to the switching power supply device, it is unnecessary to send a signal indicating the weight of the load so that it is possible to lower the power consumption of the device connected to the apparatus in standby with a simple arrangement. Moreover, the method of controlling under the heavy load is identical with the conventional method so as not to cause any problem.

Furthermore, since the differentiating circuit composed of the capacitor C10 for removing a D.C. component and the conventional voltage dividing resistors R1 and R2 is adopted as the superposition means, it is possible to implement the superposition means by a simple circuit with which only the capacitor C10 is provided, and also the fluctuation detection circuit 31 can be implemented simply by: the series circuit made up of the diode D11 and the capacitor C11; and the load resistor R11. Incidentally, even if the fluctuation component is superposed on the output voltage information which is fed back, no problem arises as long as an average of the value Vdiv of the divided output voltage is equal to the predetermined output voltage.

Apart from the devices described in BACKGROUND OF THE INVENTION, there are commercially available devices (so-called IPD, Intelligent Power Device) in which a main switching element is integrated with a switching control circuit. Among them, there are devices conducting a switching operation intermittently under the light load so that it has been possible to provide a power supply device with low power consumption when an apparatus to which the device supplies the power is in standby. However, these devices have problems such that an ON resistance of a main switching element part is high so that power conversion efficiency under the heavy load is significantly low compared with the case when the single (ad hoc) switching element Q is adopted as in the present invention, and also the IPD is costly. In the present invention the low-cost and ad hoc main switching element Q is adopted and the burst switching operation is realized with a few additional parts, so that it is possible to implement a low-cost and small power supply device having high conversion efficiency.

Meanwhile, in an arrangement in which a load in the secondary winding side is detected by an auxiliary winding such as, for instance, Japanese Laid-Open Patent Application No. 2000-341945 (Tokukai 2000-341945; published on Dec. 8, 2000), it is required to provide an auxiliary winding with a transformer. Moreover, generally the switching power supply device has a short switching periodicity under the light load when the RCC-type device such as the device disclosed in Tokukai 2000-341945 is adopted, whereas the device has a small ON duty when the PWM-type device is adopted, so that an amount of the power supplied in one switching operation is small. In the meantime, in the present invention the burst switching operation is intermittently done under the light load as well as the heavy load so that the amount of power supplied in one switching operation under the light load is identical with the same under the heavy load, and hence it is possible to further lower the power consumption by decreasing the number of switching operation.

Figure 6:
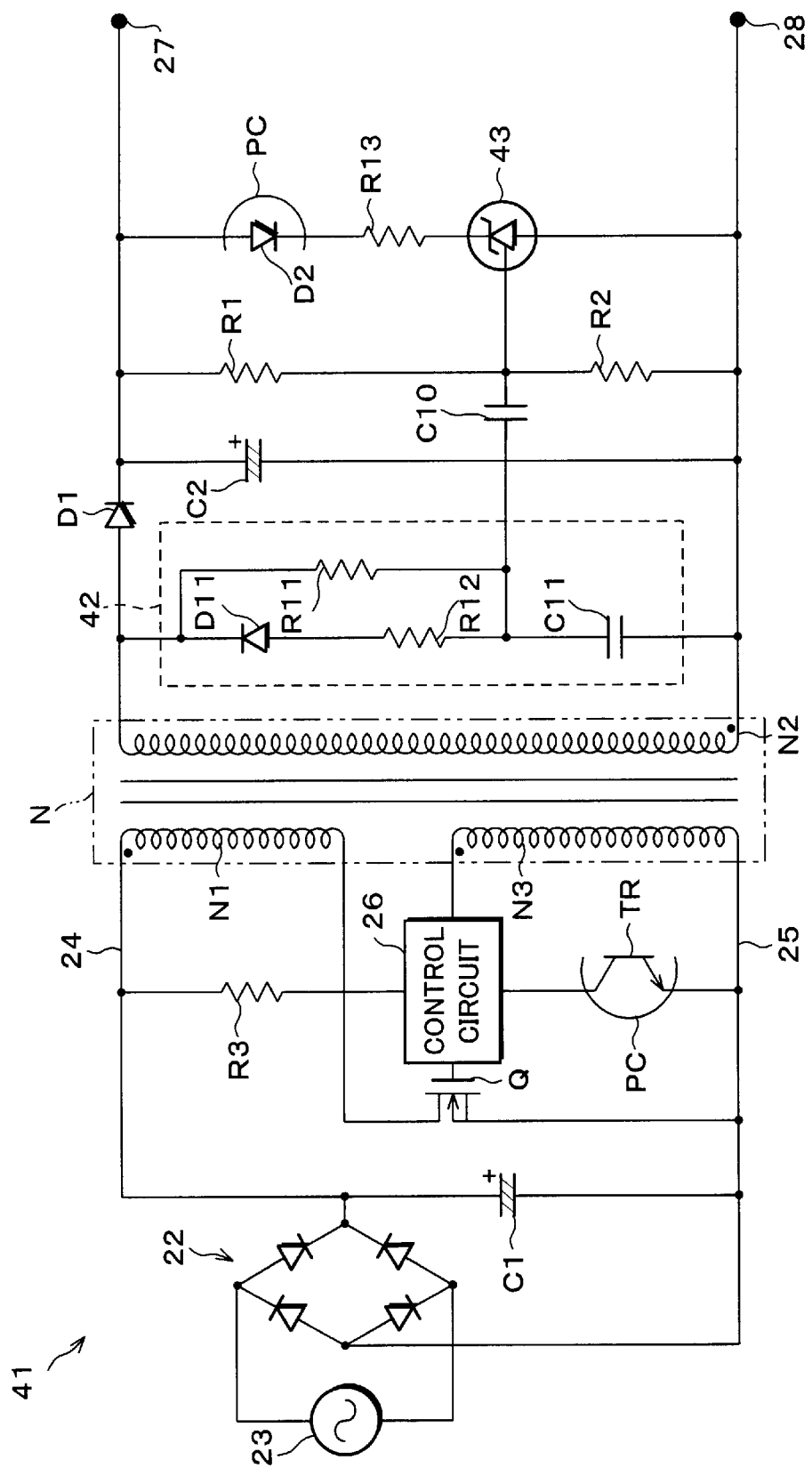
FIG. 6 is a block diagram showing an electrical arrangement of a switching power supply device in accordance with another embodiment of the present invention.

The following description will discuss another embodiment in accordance with the present invention in reference to FIG. 6.

FIG. 6 is a block diagram showing an electrical arrangement of a switching power supply device 41 in accordance with the another embodiment of the present invention. This switching power supply device 41 is similar to the switching power supply device 21 so that members having the same functions as in the device 21 are given the same numbers and the descriptions are omitted. In this switching power supply device 41, it is noted that a current limitation resistor R12 which limits the charge current of the capacitor C11 is provided in series with the diode D11 in a fluctuation detection circuit 42. The fluctuation detection circuit 42 is also arranged to have a nonlinear characteristic which is identical with the characteristic of the fluctuation detection circuit 31, as shown in FIGS. 4(a) and 4(b). This fluctuation detection circuit 42 can also be arbitrarily provided in any part of the device 41 as long as in a part where a high frequency voltage in accordance with the switching is generated.

In this manner the presence of the current limitation resistor R12 in series at the moment of charging the capacitor C11 makes it possible to control the amount (degree) of superposition of the output voltage from the fluctuation detection circuit 42 on the output voltage information. On this account, it is possible to adjust the critical point shown in FIGS. 4(a) and 4(b) and set the level of the output voltage at the moment of shifting from the state of continuous switching operation not after the time t1 to the state of intermittently conducting switching operation not before the time t1.

Moreover, the switching power supply device 41 is arranged so that a shunt regulator 43 and a resistor R13 are provided instead of the comparator circuit 29 and the reference voltage source 30. The shunt regulator 43 compares a reference voltage from a reference voltage source provided inside the regulator 43 with an output from the fluctuation detection circuit 42 via the capacitor C10 so that the regulator 43 drives the photodiode D2 of the photocoupler PC through the resistor R13.

Figure 7:
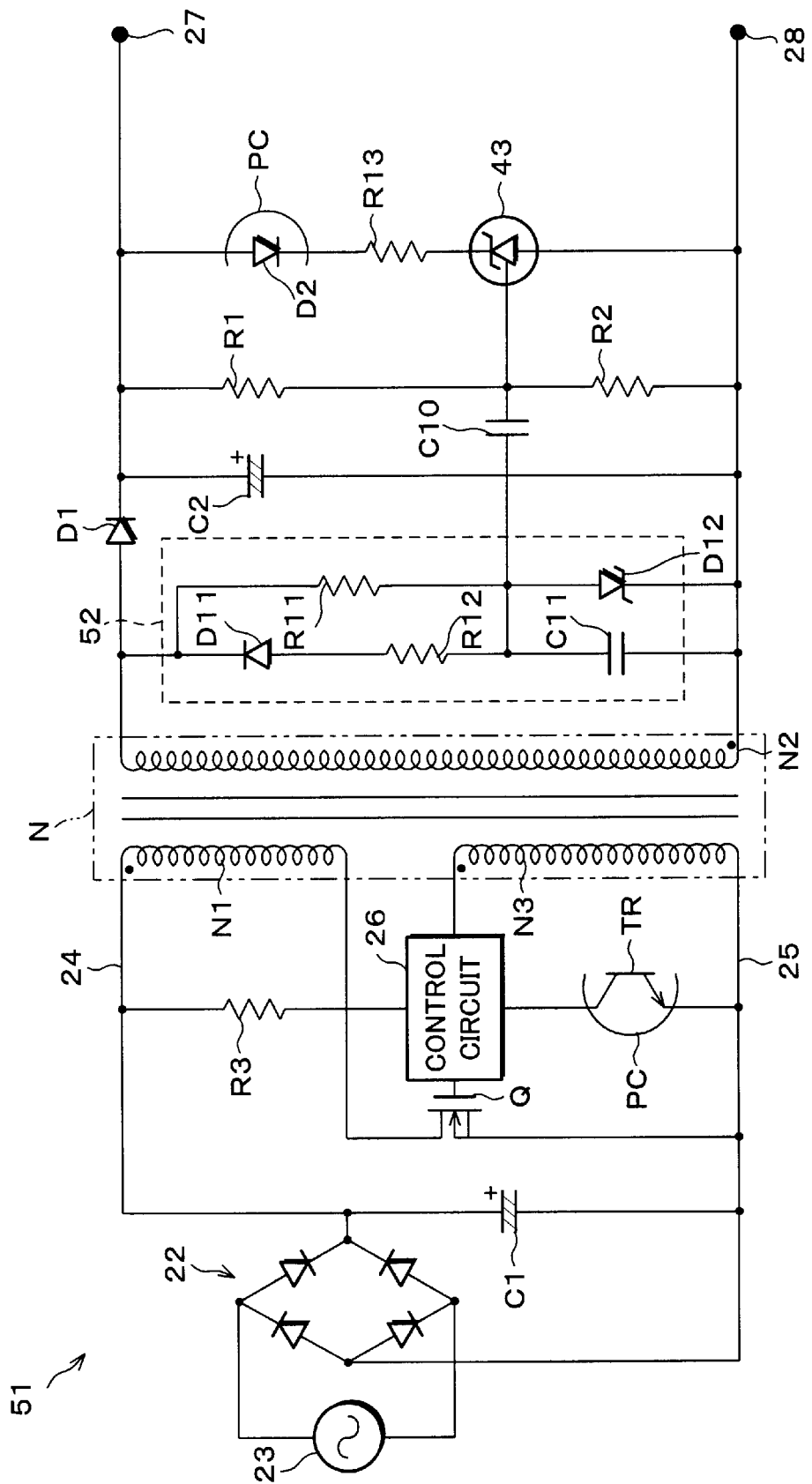
FIG. 7 is a block diagram showing an electrical arrangement of a switching power supply device in accordance with a further embodiment of the present invention.
Figure 8:
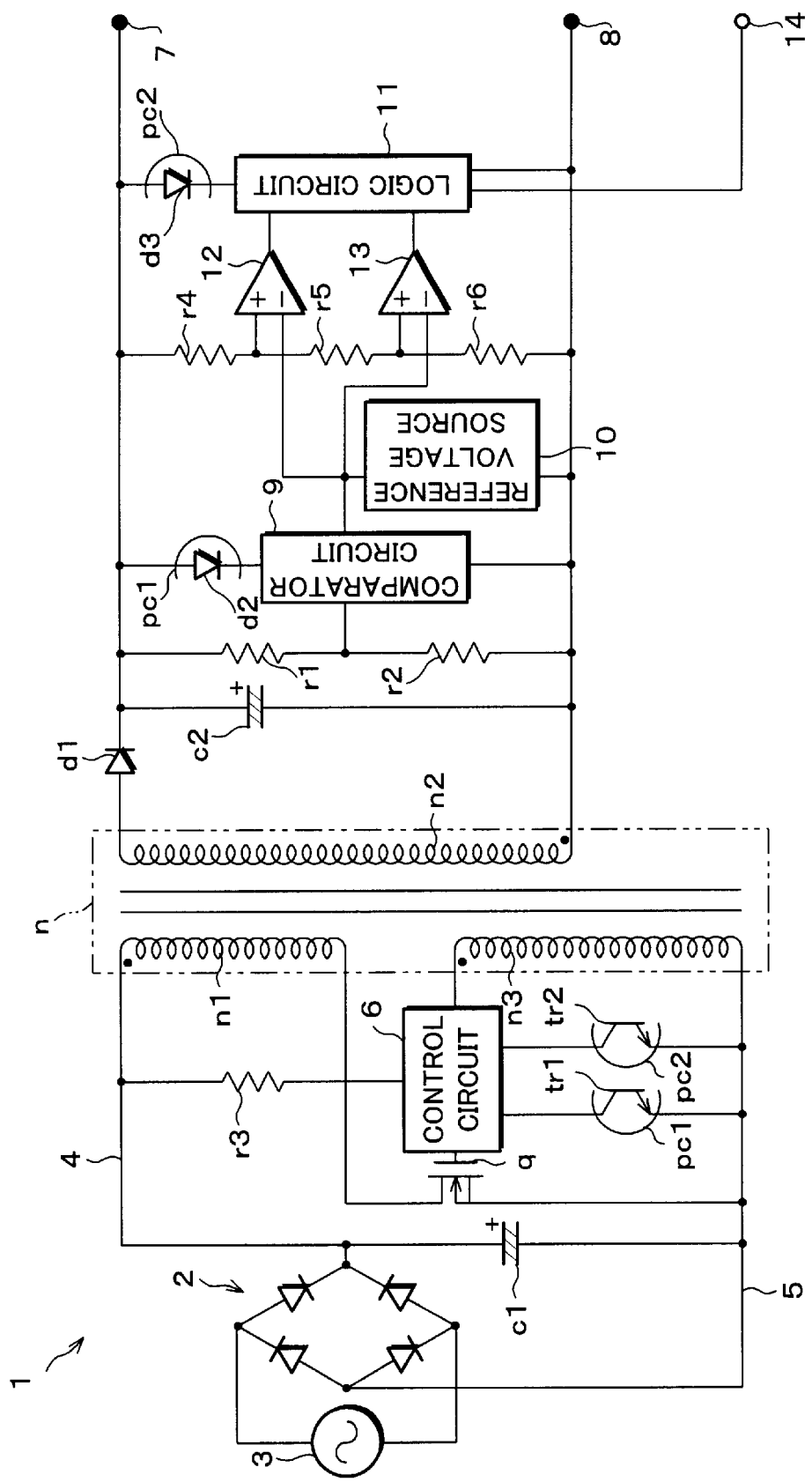
FIG. 8 is a block diagram showing an electrical arrangement of a typical conventional switching power supply device.

The following description will discuss a further embodiment in accordance with the present invention in reference to FIG. 7.

FIG. 7 is a block diagram showing an electrical arrangement of a switching power supply device 51 in accordance with the further embodiment of the present invention. This switching power supply device 51 is similar to the switching power supply device 41 so that members having the same functions as in the device 41 are given the same numbers and the descriptions are omitted. In this switching power supply device 51, it is noted that a Zener diode D12 is provided in parallel with the capacitor C11 in a fluctuation detection circuit 52. Provided that the Zener diode D12 has a Zener voltage at the critical level REF shown in FIGS. 4(a) and 4(b), a voltage higher than the Zener voltage is eliminated so that it is possible to make the Zener voltage have a characteristic close to the aforementioned optimum characteristic. However, it is noticed that the critical point is moved so that the position of the critical point is adjusted by varying the values of the resistors R11 and R12.

As described above, the switching power supply device (21, 41, 51) of the present invention, arranged such that control means (26) stabilizes an output voltage to be a target value, by controlling switching of a main switching element that switches on or off a supplied D.C. voltage in accordance with output voltage information fed back from a secondary winding side, includes:

fluctuation detection means (31, 42, 52), for detecting a fluctuation of controlling of the control means and transmitting a detected output in accordance with nonlinear output characteristics, only under a light load; and superposition means (C10), for attracting a fluctuation in the output from the fluctuation detection means and superposing the fluctuation on the output voltage information, wherein the control means judges that the device operates under the light load in accordance with an A.C. component of the fluctuation, which has been fed back.

According to this arrangement, the RCC-type or PWM-type switching power supply device is arranged such that the output power supply information, fed back from the secondary winding side to the control means which is for controlling the switching of the main switching element via a photocoupler etc. for the sake of insulation, has relatively long change periodicity (like D.C.), and in the present invention, the A.C. component of the control fluctuation which component has relatively short change periodicity (like A.C.) is superposed on the output voltage information.

When the RCC-type device is adopted, the control fluctuation has a characteristic such that a switching frequency varies in accordance with the weight of the load. Especially the switching frequency is high under the light load so that each element related to the output voltage control cannot operate speedy enough to keep up with the control instruction. Thus although the weight of the load is kept constant, the control fluctuation occurs due to the variance of the switching frequency. Meanwhile, when the PWM-type device is adopted, the switching frequency is kept constant. However, although the weight of the load is constant, the control fluctuation occurs due to a control error of the output voltage so that an ON duty of the main switching element is not consistent, especially under the light load close to no load.

Thus the control fluctuation is detected by the fluctuation detection means and the detected component is fed back in accordance with the nonlinear output characteristic only when the device operates under the light load, and this enables the control means to judge that the device operates under the light load, and in accordance with the judgement, the control means adjusts a control sequence of the output voltage. Therefore, for instance, when the operation of the device under the heavy load is shifted to the same under the light load, the fluctuation is amplified so that an intermittent switching is automatically conducted. Meanwhile, if the load increases when the intermittent switching is conducted, the switching operation period becomes gradually longer while the switching stop period becomes gradually shorter, and hence a continuous switching matched with the normal load is automatically resumed.

Then since the superposition means superposes an A.C.-like signal which is the A.C. component of the control fluctuation being extracted, it is possible to feed the component of the control fluctuation back to the control means without causing any influence on the output voltage information fed back in a feedback system of the existing output voltage information, so that this enables the control means to judge that the device operates under the light load in accordance with the fluctuation which has been fed back. On this account, it is unnecessary to supply a signal indicating the weight of the load from the outside, and hence it is possible to provide the switching power supply device with low power consumption when an apparatus to which the device supplies the power is in standby, with a simple arrangement. Incidentally, the control under the heavy load is done identically with conventional methods of the control so that no problem arises.

The switching power supply device of the present invention may be arranged such that: the superposition means is a differentiating circuit including a capacitor (C10) for removing a D.C. component and voltage dividing resistors for dividing an output voltage so as to produce the output voltage information; the output from the fluctuation detection means is supplied to a node between the voltage dividing resistors via the capacitor; and the output voltage information is produced by comparing a voltage at the node with a reference voltage by means of a comparator circuit (29).

According to this arrangement, the differentiating circuit can extract an A.C. component of the control fluctuation and superpose the component on the output voltage information. Thus it is possible to adopt a simple circuit, in which the existing voltage dividing resistors are provided along with the capacitor for removing a D.C. component, as the superposition means.

The switching power supply device of the present invention may be arranged such that the fluctuation detection means includes: a series circuit, provided in parallel with a secondary winding (N2) of a transformer (N) and composed of a diode (D1) and a capacitor (C11), which is charged by an induction voltage having one polarity so as to supply the D.C. voltage in accordance with electric charges of the capacitor; and a load resistor (R11) for discharging electric charges.

According to this arrangement, it is possible to transform the output into a D.C. voltage level in accordance with the nonlinear characteristic so that the D.C. voltage level indicates a high frequency voltage of the control fluctuation being detected and rectified.

Thus the fluctuation detection means can obtain the nonlinear characteristic with a simple arrangement so that it is possible to certainly remove a fluctuation component under the heavy load or detect only the fluctuation component under the light load and feed the same back.

The switching power supply device of the present invention may be arranged such that the fluctuation detection means further includes a current limitation resistor (R12), which is provided in series with respect to the diode, for limiting a charge current of the capacitor.

According to this arrangement, it is possible to control the amount (degree) of superposition of the output voltage from the fluctuation detection circuit on the output voltage information. On this account, it is possible to adjust the critical point of the nonlinear characteristic.

Thus it is possible to set the level of the output voltage at the moment of shifting from the state of continuous switching operation to the state of intermittently conducting switching operation.

The switching power supply device of the present invention may be arranged such that the fluctuation detection means further includes a Zener diode (D12) provided in parallel with the capacitor.

According to this arrangement, provided that the Zener diode has a Zener voltage at the critical level of the nonlinear characteristic, a voltage higher than the Zener voltage is eliminated so that it is possible to set the nonlinear characteristic close to an optimum characteristic.

As described above, the switching power supply device (21, 41, and 51) detects the control fluctuation only under the light load by the fluctuation detection means (31, 42, and 52), and by the superposition means (C10, R1, and R2), an A.C. component of the result of detection is extracted so as to be superposed on the output voltage information, and then the component is fed back to the control means (26) for stabilizing the voltage.

On this account the control means can judge that the device operates under the light load in accordance with the A.C. component of the control fluctuation so that it is unnecessary to supply a signal indicating the weight of the load from the outside, and hence it is possible to provide the switching power supply device with low power consumption when an apparatus to which the device supplies the power is in standby, with a simple arrangement.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A switching power supply device, comprising:

control means, for controlling switching of a main switching element that switches on or off a supplied D.C. voltage in accordance with output voltage information fed back from a secondary winding side so that an output voltage is stabilized to be a target voltage;

fluctuation detection means, for detecting a fluctuation of controlling of the control means and transmitting a detected output in accordance with nonlinear output characteristics, only under a light load; and superposition means, for attracting a fluctuation in the output from the fluctuation detection means and superposing the fluctuation on the output voltage information, wherein the control means judges that the device operates under the light load in accordance with the fluctuation, which has been fed back.

2. The switching power supply device as set forth in claim 1, wherein: the superposition means is a differentiating circuit including a capacitor for removing a D.C. component and voltage dividing resistors for dividing an output voltage so as to produce the output voltage information; the output from the fluctuation detection means is supplied to a node between the voltage dividing resistors via the capacitor; and the output voltage information is produced by comparing a voltage at the node with a reference voltage by means of a comparator circuit.

3. The switching power supply device as set forth in claim 2, wherein the fluctuation detection means includes: a series circuit, provided in parallel with a secondary winding of a transformer and composed of a diode and a capacitor, which is charged by an induction voltage having one polarity so as to supply the D.C. voltage in accordance with electric charges of the capacitor; and a load resistor for discharging electric charges.

4. The switching power supply device as set forth in claim 3, wherein the fluctuation detection means further includes a current limitation resistor, which is provided in series with respect to the diode, for limiting a charge current of the capacitor.

5. The switching power supply device as set forth in claim 4, wherein the fluctuation detection means further includes a Zener diode provided in parallel with the capacitor.

6. The switching power supply device as set forth in claim 1, wherein the fluctuation detection means includes: a series circuit, provided in parallel with a secondary winding of a transformer and composed of a diode and a capacitor, which is charged by an induction voltage having one polarity so as to supply the D.C. voltage in accordance with electric charges of the capacitor; and a load resistor for discharging electric charges.

7. The switching power supply device as set forth in claim 6, wherein the fluctuation detection means further includes a current limitation resistor, which is provided in series with respect to the diode, for limiting a charge current of the capacitor.

8. The switching power supply device as set forth in claim 7, wherein the fluctuation detection means further includes a Zener diode provided in parallel with the capacitor.

9. The switching power supply device as set forth in claim 1, wherein the control means intermittently repeats a switching operation period in which the switching of the main switching element is conducted and a switching stop period in which the switching is stopped, when judging that the device operates under the light load.

10. The switching power supply device as set forth in claim 1, wherein the device is a ringing choke convertor type.

11. The switching power supply device as set forth in claim 1, wherein in accordance with the output voltage information, the control means controls a width of a switching pulse of the main switching element so as to stabilize the output voltage stabilized to be the target value.

* * * * *